United States Patent
Knapp et al.

(10) Patent No.: US 9,101,841 B1
(45) Date of Patent: *Aug. 11, 2015

(54) PERFORMANCE BASED FOOTBALL SCORING SYSTEM

(71) Applicant: Big Play Scoring, LLC, Houston, TX (US)

(72) Inventors: Michael Knapp, Houston, TX (US); Jack Stanfield, Houston, TX (US); Michael Duvall, Houston, TX (US); Jeff James, Houston, TX (US)

(73) Assignee: Big Play Scoring, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/470,600

(22) Filed: Aug. 27, 2014

Related U.S. Application Data

(63) Continuation-in-part of application No. 14/336,408, filed on Jul. 21, 2014, now abandoned, which is a continuation-in-part of application No. 13/785,748, filed on Mar. 5, 2013, now Pat. No. 8,944,921.

(60) Provisional application No. 61/684,245, filed on Aug. 17, 2012, provisional application No. 61/606,536, filed on Mar. 5, 2012.

(51) Int. Cl.
*A63B 71/06* (2006.01)
*A63F 13/46* (2014.01)
*A63F 13/828* (2014.01)
*A63F 13/65* (2014.01)

(52) U.S. Cl.
CPC ............... *A63F 13/46* (2014.09); *A63F 13/65* (2014.09); *A63F 13/828* (2014.09)

(58) Field of Classification Search
CPC ............ A63F 13/00; A63F 9/24; A63B 71/06
See application file for complete search history.

(56) References Cited

U.S. PATENT DOCUMENTS

| | | | |
|---|---|---|---|
| 6,371,855 B1 | 4/2002 | Gavriloff | |
| 6,656,042 B2 | 12/2003 | Reiss et al. | |
| 7,614,944 B1 | 11/2009 | Hughes et al. | |
| 2006/0252476 A1 | 11/2006 | Bahou | |

FOREIGN PATENT DOCUMENTS

WO    2010/085429 A1    7/2010

*Primary Examiner* — Paul A D'Agostino
*Assistant Examiner* — Ankit Doshi
(74) *Attorney, Agent, or Firm* — Hulsey Hunt P.C.

(57) ABSTRACT

An automated, replicable, process-based original concept that provides a self-validating, defined quantification of the relevance of a series of plays of two or more different competing real-life football teams engaged in a real-life American-style football contest or its adaptations resulting in a traditionally defined winner and loser.

31 Claims, 5 Drawing Sheets

PERFORMANCE BASED FOOTBALL SCORING SYSTEM

TECHNICAL FIELD

This disclosure relates in general to a scoring system and more particularly to a scoring system for measuring performance data of a real-life American-style football contest.

BACKGROUND

Fantasy sport leagues are becoming widespread through the United States and the world. Fantasy sports allow sports fans to take an active role in professional or collegiate sports where the sports fans act as team owners to build a team that competes against other fantasy sport teams. The fantasy sport team owner creates their own roster of players by drafting players from actual professional or collegiate sports teams and use those players' real-life performance in professional or collegiate games to convert statistical performance into points. However, current fantasy sport leagues are organized and scored in such a manner that in order to be successful, the participant must be a real sports enthusiast with time to follow entire leagues of players and teams, rendering the fantasy sports leagues less accessible to moderate sports fans.

Fantasy sport leagues may be based upon a number of different sports, including, but not limited to: football, basketball, baseball, hockey, soccer, cricket, golf, auto racing, mixed martial arts, professional wrestling, boxing, billiards, bowling, chess, etc. The fantasy sport leagues can even further be based upon the different leagues or associations within a sport. For example, a fantasy football league may be based upon the National Football League or it may be based upon NCAA Collegiate football. Similarly, a fantasy basketball league may be based only on the National Basketball Association's (NBA) Eastern Conference or Western Conference. Some fantasy sport leagues may be even further limiting, and restrict fantasy sport leagues to only certain teams or even certain categories of players.

There currently exist many different scoring systems and corresponding fantasy points. Generally, fantasy points are based upon actual player or team performance in a particular game or event. Probably the most common scoring system converts statistical performance of real-life players or teams into fantasy points that are compiled and totaled according to a selected roster of the fantasy team. More complex variants may include computer modeling of actual games, but based upon selected fantasy roster, based on statistical input generated by real-life players or teams. However, different sports fantasy leagues often include different scoring systems that can make certain players or teams more or less valuable in one fantasy sports league as opposed to another different fantasy sports league.

One exemplary scoring system, head-to-head league scoring, is based on fantasy teams competing weekly to see which teams can compile the best statistics across a number of different scoring categories, with "wins" awarded based on the cumulative total for each scoring category used in the league for the week. Using basketball as an example, the league may be set up to use points scored, rebounds, assists, blocked shots, field goal percentage (FG %), free throw percentage (FT %) and 3 pointers made as scoring categories. If in a given week, a team has more assists than its opponent's, the team would be credited with a "win" for that scoring category. However, if the opponent's team ended the week with more blocked shots, the team be charged with a "loss" for that scoring category. If the two teams end up tied in a given category, each will receive credit for a "tie". This weekly win-loss-tie total will be added to a cumulative season record, which can be used to determine final standings or playoff seeding. These standings will be based on your team's overall winning percentage, which is calculated by taking your win total and adding one-half of your tie total and dividing the sum by the total number of games your team has played. Unfortunately, this requires the fantasy sport league participant to draft and form teams based on their ability to produce in various scoring categories. This requires a deep knowledge of individual players and team; consequently, most sports fans merely root for their hometown teams, without the underlying knowledge of sports statistics.

Another exemplary scoring system, the fantasy point league scoring, is based on points being awarded on how well players perform in each of predetermined statistical scoring categories. All real-life statistics have associated point values, and each player's points are summed to produce daily totals. Using football as an example, the league may be set up to give a certain number of fantasy points for touchdowns scored, rushing yards, passing yards, receiving yards, field goals, etc. If in the league, a touchdown is worth six points, 10 rushing yards worth one point, and 10 receiving yards worth one point, a player with two touchdowns, 100 yards rushing, and 30 yards receiving would score 12 points for two touchdowns, 10 points for 100 rushing yards and 3 points for 30 receiving yards, which would total 25 fantasy points for that player. Fantasy points are only awarded to starting players on your fantasy team's roster. This scoring method may be used to determine a weekly, head-to head winner as is frequently used in fantasy football leagues. Alternatively, it may be used to keep a running total of fantasy points throughout the season as is commonly used in fantasy basketball, football and baseball leagues. In these leagues, the team with the highest total of fantasy points at the end of the year is the league champion. This scoring system suffers from the same drawbacks as head-to-head league scoring, namely, that fantasy sports league participants require extensive knowledge of individual players' statistics and is further compounded with the fact that only players on the roster generate points. Fantasy sports league participants often need to change up their rosters in response to real-life player injuries or underperformance.

Many of these scoring drawbacks are evident in the fantasy sport team formation process, often referred to as the draft. The goal of the draft is to choose the players that the fantasy sport league participant believes will generate the most fantasy points. These participants choose real-life players based upon published statistics for that player and draft the player onto their fantasy team based upon availability and whatever other information they have gathered. Preparation for this draft process can be an incredibly time consuming effort, especially where the fantasy sport league's scoring system is complex. Additionally, the choice of players and their position within the roster can be a tedious process.

Another scoring drawback is the inability to weight particular plays, accomplishments, or successes. Each "win" or each accomplishment is awarded the same points (e.g. one point for each 20 yards of rushing). Existing fantasy sports scoring systems have attempted to address this by adjusting the accomplishment instead of the scoring itself (e.g. one point for 30 yards of rushing as opposed to one point for 20 yards of rushing). Furthermore, existing fantasy sports scoring are based on the total statistics for a player (e.g. the entire games total in a certain statistical area).

Although various scoring systems for fantasy sport leagues are known in the art, all, all of them suffer from one or more disadvantages. Therefore a need has arisen for a more automated and replicable scoring system which corrects the problems identified above.

SUMMARY

The following disclosure presents concepts for improving scoring systems of fantasy sport leagues for real-life American-style football and its adaptations. The disclosed subject matter significantly improves upon prior scoring systems aimed at measuring real-life player or team performance. It is an object of the present disclosure to provide self-validation, defined quantification of relevant and active physical efforts performed by competing real-life football teams engaging in real-life American-style football contests or its adaptations.

The present disclosure teaches an automated, replicable scoring process, wherein there is a defined quantification of the relevance of active physical efforts performed by competing real-life football teams engaging in real-life American-style football contests or its adaptations, resulting in ranking of participants based on their performance relative to another.

One aspect of the disclosed subject matter is pre-determined point levels for achievements within a game.

Another aspect of the disclosed subject matter is the ability to simplify fantasy league scoring for participants.

Yet another aspect of the disclosed subject matter is the ability for multiple fantasy sport league participants to score on the same play.

Another aspect of the disclosed subject matter is a hybrid team challenge wherein multiple participants may compete in their knowledge of American-style football or its adaptations in various scoring components.

Yet another aspect of the disclosed subject matter is random, auto-generated selection of scoring components.

Another aspect of the disclosed subject matter is the opportunity to foster continued engagement with the system by including additional scoring opportunities.

Yet another aspect of the disclosed subject matter is recognition of achievements by fantasy sport league participants.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of the appended claims and/or those claims filed later.

BRIEF DESCRIPTIONS OF THE DRAWINGS

The novel features believed characteristic of the presently disclosed subject matter are set forth in the claims appended hereto or will be set forth in any claims that are filed later. The presently disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE SPECIFIC EMBODIMENTS

Figure 1:
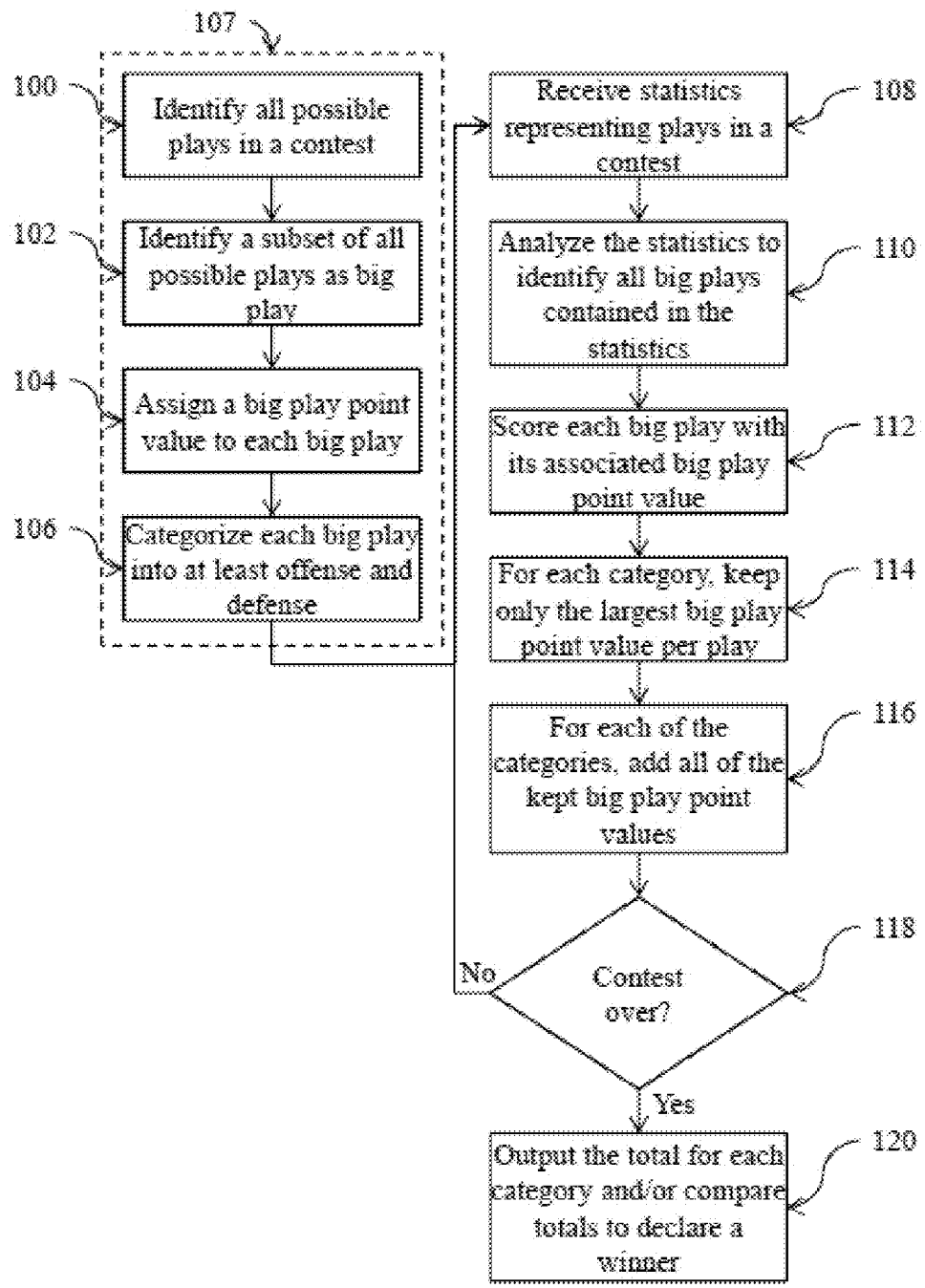
FIG. 1 depicts a generalized flow chart of the setup and application of the method according to the disclosed subject matter.

Although described with particular reference to football, those with skill in the arts will recognize that the disclosed embodiments have relevance to adaptations of American-style football in addition to those specific examples described below.

All references, including publications, patent applications, and patents, cited herein are hereby incorporated by reference to the same extent as if each reference were individually and specifically indicated to be incorporated by reference and were set forth in its entirety herein.

The present disclosure enables an alternative analysis method and scoring system for American-style football and its adaptations as described herein.

Football enthusiasts have often wondered why an exemplary 14-10 game can be infinitely more compelling than a second exemplary 27-24 game. It is counter-intuitive that the game with fewer points scored can be immeasurably more entertaining to watch than the contest with more points. However, if one takes a step back and takes an objective view of the sport, football is essentially an offensive team of eleven players that have four chances, or downs, to advance the ball ten yards from the spot they took possession of it. At the same time, the opposing team's set of eleven defensive players are trying to thwart that ten yard advance. The majority of the game is comprised of small back and forth gains and losses. A few yards may be gained by throwing or running, and a few yards lost by being tackled. However, very little of this has a direct impact on the points that end up on the scoreboard.

For example, Quarterback A is throwing well and has thrown to advance the ball up the field for a total of 70 yards. However, as the team is trying to enter the end zone to score, multiple mistakes happen. Perhaps the running back runs the wrong route and misses his catch. Perhaps Quarterback A throws errantly too high for the receiver to catch. On the fourth down, the offense is forced to punt the ball downfield. There was a tremendous amount of effort expended, and in traditional fantasy football scoring systems Quarterback A will look great for having just completed 70 passing yards. However, none of that is reflected on the scoreboard and has no bearing on the ultimate outcome of the game. This overall back and forth, give and take process is even more evident in the game of basketball where if distilled down enough, players are just running up and down the court attempting to put the ball in the basket for two points.

In prior standard fantasy football scoring systems, the goal was to define statistical and point-value relationships to ensure that each fantasy position and player was relatively equal in weight and value with regards to the system. These are some relatively well established offensive scoring rules in fantasy football that are in use today:

Touchdowns: 6 points—In the standard fantasy football scoring system, touchdowns are universally worth 6 points, just like in real life. It does not matter if the touchdown was scored by a quarterback, receiver, running back, defensive safety, or even a kicker; all touchdowns are 6 points.

Rushing: 1 point per 10 yards—Each rushing yard in fantasy football will net the fantasy team 0.1 point if the league awards fractional points, or 1 point for every 10 yards.

Receiving: 1 point per 10 yards—Each receiving yard in fantasy football will net the fantasy team 0.1 point, or 1 point for every 10 yards.

Passing: 1 point per 25 yards—Because passing yards are much easier to come by than rushing or receiving yards, they are not worth quite as much. Passing yards in the standard scoring system are worth 0.04 point, or 1 point for every 25 yards.

Now, imagine this scenario from an exemplary football game where the following statistics were compiled for three different fantasy players. Quarterback: 375 yards passing; Running Back: 40 yards rushing, 2 touchdowns; Wide Receiver: 100 yards receiving, 1 touchdown. Each of these would have resulted in the same output: 16 fantasy football points. However, it is difficult to gauge whether these values actually helped the team gain an advantage over their competitor or whether the values are standard within the back and forth nature of the sport.

The main driver that differentiates results of games and contests are the "big plays", something out of the ordinary from the mundane regular few yard gains and losses from running and passing plays. If one watches a football game and keeps tally of the "big plays" of both teams and keeps a running total of the tally of big play points vs. points on the scoreboard, some very interesting conclusions emerge. At the conclusion of each score, period, or contest, the team with the most big plays is more likely than not to prevail on the scoreboard as well. Interestingly, big play totals will often tell a more accurate story of how close or lopsided, entertaining or boring the game really was.

The present disclosure teaches an original concept based on the awarding of points for big plays during an American-style football game or its adaptations relative and commensurate to both their impact on the contest as well as a more genuine reflection of the game's true level of achievement, accomplishment, and competition. Whereas other scoring systems may focus on individual statistics that may be irrelevant to results by itself, the teachings of the present disclosure provides a quantitative measurement of the plays and achievements during any given American-style football game or its adaptations that actually impact the game's outcome.

FIG. 1 depicts a generalized flow chart of the setup and application of the method according to the disclosed subject matter. At step 100 the possible plays in a particular contest are identified. Then some subset of the possible plays are identified as the big plays (those plays that change the moment of the game or are otherwise non-routine) 102. Each of the identified big plays are assigned a relative big play point value 104. The big play point value is an indication of just how "big" the play is when compared to the normal and routine plays in a contest. Finally, each big play is categorized, for example, into offense, defense, or both 106. Because a particular play could result in multiple big plays (e.g. first-down to first-down and a touchdown of 50+ yards) only the highest scoring big play is kept. By categorizing the big plays, it makes identifying which of the big plays scores the highest while still allowing each team to receive points for a big play. This completes the basic setup 107.

Statistics are received from a statistics provider which represents one or more plays in a contest 108. The statistics could be streamed live or after the end of the contest. The statistics are analyzed to identify one or more big plays 110. If there were any big plays, the big plays are scored according to the associated big play point value 112. For each play and for each category and/or participant (e.g. team) in the contest, only the largest big play point value is kept 114. For each of the categories and/or participants, all of the kept big play point values are totaled 116. If the contest is not over 118, more statistics are received 108 and the process continues. If the contest is over 118, the totals are output and/or compared to identify a winner 120.

As a more concrete example, scoring rules and point values for a fantasy league football are discussed in more detail. The scoring system is affected by designating, to the offense, defense, and special teams, awards of pre-determined points for corresponding big plays. Again, these are plays and actions that are relatively exceptional when compared to regular touchdowns or five yard passes. For exemplary purposes, a gain of 10 yards on First Down would garner a point because it results in going "First Down to First Down". But on any other down, there must be a score, or a gain of at least 20 yards to get points. A gain of 19 yards on 2nd or 3rd down would not be awarded points, and it would only earn points on 4th down if it resulted in a "4th Down Conversion".

The system does not allow for awards of multiple plays to any given team for any given one play; it will choose the big play that grants the most points. For exemplary purposes, a gain of 40+ yards on First Down would not get 1 Point for going "First Down to First Down" and 2 Points for a "Gain of 40+ yards". The play would be awarded just the two points for the offense having gained 40+ yards. However, sometimes both teams can score big play points on the same play. If an offensive unit in the Red Zone (within 20 yards of the goal line) is held to a Field Goal, they would get 1 Point for having scored, but the defensive unit would also be awarded 1 Point for having held their opponent in the Red Zone to only a Field Goal.

In practice, a fantasy sport participant would be able to organize a hybrid team challenge, a big play point originated, multi-person engagement game pitting participants' knowledge of teams against one another whereby one seeks the greatest sum total of one of 32 team's offense, one of 32 team's defense, and one of 32 team's special teams. As noted previously, this enables participation by those who have a basic understanding of sport dynamics and basic team formations, but lack the knowledge of diehard sports fanatics and enthusiasts. All that is required to compete is the ability to pick and choose one of the National Football League's 32 teams (or any football league or Collegiate Conference in other embodiments) and their offensive, defensive, or special teams. Participants may be able to play the hybrid team challenge throughout the whole football season, including the playoffs. The participants may also join anytime during the football season, even in midseason. An alternative exemplary embodiment of the present disclosure is a version of the hybrid team challenge wherein a computer system auto-generates a random selection of the three components for participation in the hybrid team challenge.

It is contemplated within the present disclosure to enable selecting additional Hybrid Teams on the Thursday and Monday night football games. This is a self-perpetuating Component of the hybrid team challenge that encourages and otherwise fosters a continued engagement in the game by including additional scoring opportunities by virtue of the outcome of the first game and final game of the week, and ability to predict superiority of the teams' three units relative to each other.

It is further contemplated that the scoring system may include a scoring trifecta, the achievement of accurately predicting each of the weekend's top big play selections for offense, defense, and special teams. In this way, the system further fosters participation and engagement by providing incentives for high level performance, while not necessarily having to compete against any other fantasy sport league participant.

In a preferred embodiment, a participant may be emailed from the computer system a chosen "Starter Team" that the participant selected upon registration with the fantasy league football. This "Starter Team" comprises an Offense, Defense, and Special Teams unit. The participant may choose to either substitute for the upcoming week of play any one or more of the Offense, Defense, or Special Teams of the starter team (with different teams comprising each team element) or accept the original starter team as a hybrid team for the hybrid team challenge for the upcoming week of play. The participant is not limited by other players' selections. In order for a participant to win a hybrid team challenge, the participant must have the most total Big Play Points than any other participant. Factors that may affect a total amount of Big Play Points include weather, style of play, opponents, etc. Ties may be broken based on hybrid opponent scores and backup selections.

Furthermore, the disclosed subject matter could be integrated into, or made the focus or background or, Broadcast Studio Production and/or Pre-Game and Post-Game Analysis including past and future games.

Additionally, the teachings of the present disclosure may be enabled within broadcast content generation, sports commentary, analysis, reporting, and various social media related applications. When it comes to sports, invariably, invincibility gives way to the inevitability of diminishing strength, skills, and reflexes. With sports commentary, analysis and reporting, the magic of an original style is as infinite as the desire to improve with each and every opportunity.

Figure 2:
FIG. 2 depicts a series of screenshot of an electronic device based computer application employing the enclosed analysis method and scoring system and showing the sequence of a participant signing in and picking a hybrid team.

FIG. 2 depicts a series of screenshots of an electronic device based computer application employing the enclosed analysis method and scoring system and showing the sequence of a participant signing in and picking a hybrid team. The first screenshot depicts the main screen of the app where a participant may "sign in" to the app so that the participant may participate in the scoring system against other participants. Once signed in, a participant may be led to a profile page, wherein the participant may choose a favorite team as well as an offense, defense, and special teams of one or more football teams, which is designated as a default or starter team. After a participant chooses teams, the gameday screen may be displayed. The gameday screen shows picks for the participant for each week of the football season. Changes to the picks may be done by the participant if the game that the picks correlate to has not been played yet. Once a specific week is chosen by the participant, the participant may then "draft" their hybrid team by picking an offense, defense, and special teams unit of one or more football teams. In order to aid in the process, the screen may show numbers for each offense, defense, and special teams unit of each football team that may help a participant compare offense, defense, and special teams units from different teams. The picks made by the participant may be used in more than one fantasy football league. If a participant does not pick a hybrid team for a specific week of the football season, the participant's starter team will be played in their designated fantasy football matchups.

Figure 3B:
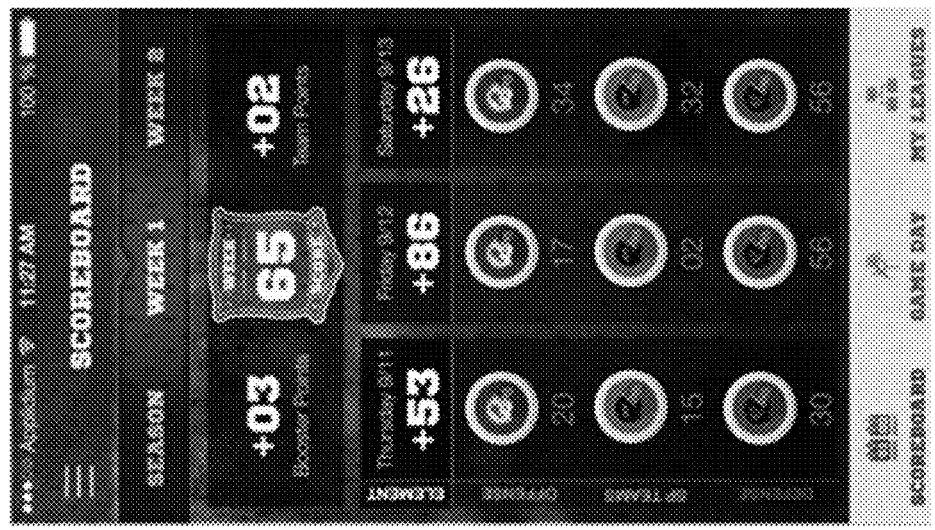
FIG. 3B depicts a screenshot of an electronic device based computer application employing the enclosed analysis method and scoring system and showing a running point total for a participant's specific hybrid team.
Figure 3A:
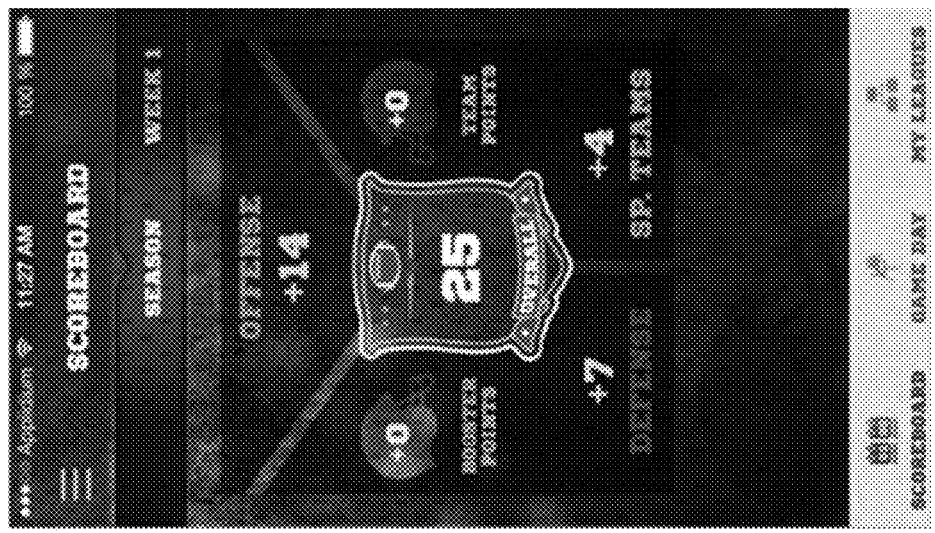
FIG. 3A depicts a screenshot of an electronic device based computer application employing the enclosed analysis method and scoring system and showing a scoreboard of a participant's specific hybrid team.

FIG. 3A depicts a screenshot of an electronic device based computer application employing the enclosed analysis method and scoring system and showing a scoreboard of a participant's specific hybrid team. The scoreboard may display three separate sections that show the number of points that each part of the hybrid team has earned for the football season. Hybrid teams chosen by the participant may be displayed for more than one day of the week and may show running totals for each of the hybrid teams; this may be displayed in FIG. 3B. Booster points and team points may be earned in addition to big play points (explained in Paragraph [0054]).

A participant may choose no more than two units from one team on a single gameday. A single gameday occurs when only one football game takes place, such as a Thursday. If a participant decides they want to score points on a single gameday, the default selection for a participant will include the home offense, home special teams unit, and visitor defense of the teams playing that day. The participant may either accept or change the default selections to the participant's preference.

In another embodiment, on a single gameday, a participant may be provided the option to choose the first big play for their offense, defense, and special teams unit for each quarter of game play. Each correct selection may earn the participant an additional 7 booster bonus points.

Every week, a participant may select whether their favorite team will win or lose. If a favorite team of a participant wins an actual football game, the participant may receive 5 bonus points and may be reflected in the overall points score for the week found in the center of the screenshot of FIG. 3A. Furthermore, if a favorite team of a participant makes the playoffs on a certain week or makes the Super Bowl, the participant may receive 5 bonus points that may also be reflected in the overall points score for that week.

A participant may be awarded additional points (booster bonus points) if one or more of a participant's chosen offense, defense, or special teams units earns the most big play points for a specific gameday. For example, an offense that earns the most big play points may earn a participant 1 booster bonus point, a defense that earns the most big play points may earn a participant 2 booster bonus points, and a special teams unit that earns the most big play points may earn a participant 3 booster bonus points. A participant may be awarded booster plus points if one or more of a participant's chosen offense, defense, or special teams units earns the most big play points for a specific gameday and the football team associated with the offense, defense, or special teams unit wins their respective football game, which will correlate to double the booster bonus points. If all three of a participant's offense, defense, and special teams unit earns the most big play points in their respective categories, the participant may earn triple the total amount of booster bonus points. Furthermore, if all three teams associated with the participant's offense, defense, and special teams unit that have earned the most big play points in their respective categories wins, the participant may earn triple the total amount of booster plus points.

Based on the point system described above, a participant may earn trophies, which can be exchanged for discounts or "Cash-in-Store" purchases. A participant may receive a trophy for each proper selection of an offense, defense, or special teams unit that collected the most big play points. If a participant places in the top ten of a sponsored league for three weeks, the participant may receive one trophy and one trophy each week thereafter if the participant continues to place in the top ten of the sponsored league. A participant may further earn a trophy if their league places in the top five best leagues out of the active leagues. Also, a participant who places in the top 3 of a private league for two weeks may receive one trophy and one trophy each week thereafter if the participant continues to place in the top three of the sponsored league.

Figure 4:
FIG. 4 depicts a screenshot of an electronic device based computer application employing the enclosed analysis method and scoring system and showing leagues created by a participant.
Figure 5:
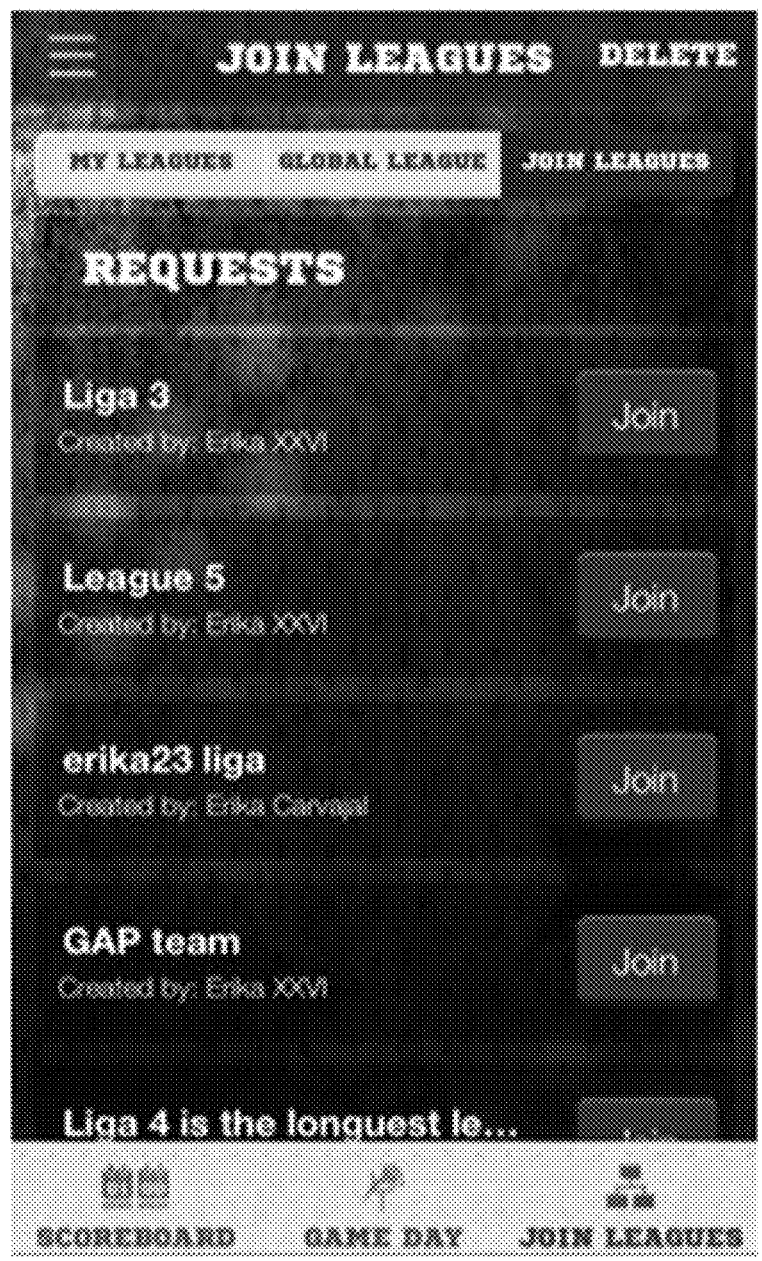
FIG. 5 depicts a screenshot of an electronic device based computer application employing the enclosed analysis method and scoring system and showing leagues a participant may join.

FIG. 4 depicts a screenshot of an electronic device based computer application employing the enclosed analysis method and scoring system and showing leagues created by a participant. When the "My Leagues" tab is engaged, a participant may view the leagues they have created and also have the option to create more leagues. Leagues for which the participant is an owner may be denoted with an "O", while a league for which a participant is a participant may be denoted with a "P". Using the hybrid team selection, a user may participate in multiple leagues simultaneously. When a participant first signs into the app and chooses an offense, defense, and special teams unit, the participant may automatically be entered into a global fantasy football league. Participants may also choose to play in sponsored or private leagues. FIG. 5 depicts a screenshot of an electronic device based computer application employing the enclosed analysis method and scoring system and showing leagues a participant may join. When the "Join Leagues" tab is engaged, a participant may view requests by owners of other leagues to join the leagues. When a participant wants to join a specific league, the participant may engage the "Join" icon next to the specific league.

Again, it is important to note that although this disclosure focuses on American-style football, adaptations of American-style football are considered within the disclosure and the disclosed subject matter could be relatively easily adapted to fit its adaptations.

As an example, sample criteria for football are provided:
Offense
Points Play Description
1 First Down to First Down
1 Gain of 20+ yards
1 4th Down Conversion
2 Gain of 40+ yards
2 Touchdown
2 2-Point Conversion
3 Touchdown of 50+ yards
Defense
Points Play Description
1 Sack/Intentional Grounding
1 3 and out
1 Fumble Recovery
1 Interception
1 Hold Opponent to Red Zone Field Goal
1 Defended 2-pt conversion attempt
2 Forced Turnover on Downs
1, 2, 3 Fumble Recovery; to Red Zone; Touchdown
1, 2, 3 Interception; to Red Zone; Touchdown
2 Hold Opponent to Red Zone No Score
2 Safety
3 Defensive Touchdown
3 Turnover in "one score" situation to "ice" game, as defined by preceding victory formation.

Special Teams
Points Play Description
1 Blocked/Missed Extra Point Attempt
1 Coffin Corner Punt/Kick Off
1 Fumble Recovery
1, 2, 3 Fumble Recovery; to Red Zone; Touchdown
1, 2, 3/7 Punt/Kickoff Return Team returns ball beyond the 50-yard line; to Red Zone; Touchdown
1, 2, 3 Fake Punt for a $1^{st}$ Down; to Red Zone; TD
1, 2, 3 Fake Field Goal for a $1^{st}$ Down; to Red Zone; TD
1, 2, 3 Field Goal<or=39 yds; 40-49 yds; >or=50 yds
2 Blocked Punt/Field Goal Attempt
2 Onside Kickoff As an additional example, sample criteria for football-negative value points are provided:
Offense
Points Play Description
−1, −2 Forced Turnover on Downs "between the 20s"; in the Red Zone
−1, −2, −3 Fumble; in/to the Red Zone; for TD
−1, −2, −3 Interception; in/to Red Zone; for TD
−2 Safety
Special Teams
Points Play Description
−1, −2, −3 Blocked Punt; in/to Red Zone; for TD
−1, −2, −3 Blocked Field Goal Attempt; in/to Red Zone; for TD
−1, −2, −3 Fumble "between the 20s"; in/to Red Zone; for TD
−1, −2, −3 Failed OS Kick returned B-50; to Red Zone; for TD
−1 Blocked/Missed Extra Point
All other plays are awarded a value of 0.

Big Play Scoring, LLC strives to capture the relevant and impactful plays ("Big Plays") in football sporting contests. Big Play Scoring, LLC has defined these Big Plays and has determined their value through a Point Valuation System. Utilizing this unique valuation approach, Big Play Scoring has created a Fantasy Game, as well as new Data Analytics of Big Play Frequency and Efficiency for analyzing sport team's performance and media content.

Big Play Frequency refers to the frequency of Big Plays based on total plays captured by each team element (offense, defense, and special teams). For example, if an offense has a total of 50 plays and 10 of those plays are Big Plays, the Big Play Frequency is 5 (50 divided by 10). So a Big Play occurs on average every 5th offensive play. This Big Play Frequency can then be compared with their opponent's offensive Big Play Frequency or with all other teams within their league.

Big Play Efficiency refers to point valuation of Big Plays based on total plays captured by each team element (offense, defense, and special teams). For example if an offense has a total of 50 plays and 10 of those plays are Big Plays, and the point valuation of those 10 Big Plays is 18, then this team has a Big Play Efficiency on offense of 36% (18 Big Play points divided by 50 offensive total plays). So in this example, 36% of total offensive plays results in scoring a Big Play point, which can then be compared with their opponent's offensive Big Play Frequency and with all other teams within their league.

Total Team Big Play Efficiency refers to the summation of a team's Big Play Efficiency on offense, defense, and special teams to calculate the overall team's efficiency performance. So if a team's Big Play Efficiency on Offense is 36%, on Defense is 24%, and on Special Teams is 25%, the Total Team Big Play Efficiency would be 85%, which can then be compared with their opponent's Total Team Big Play Efficiency and with all other teams within their league.

The foregoing description of the preferred embodiments is provided to enable a person skilled in the art to make or use the claimed subject matter. Various modifications to these embodiments, including changing point values and/or adding or deleting point opportunities, will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Further, although exemplary devices and figures to implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

The invention claimed is:

1. An apparatus operable to quantify one or more relevant and active physical efforts performed by two or more different competing real-life football teams, the two or more different competing real-life football teams engaging in at least one real-life American-style football contest or its adaptations with a predefined traditional point value for certain plays and resulting in a traditionally defined winner and loser, the apparatus further operable to:
   receive statistics via a communications medium in real-time, said statistics directly representing one or more plays from the at least one real-life American-style football contest or its adaptations relative to an offense, defense, or special teams unit, wherein the offense, defense, or special teams unit comprises eleven football players;
   analyze the statistics in real-time on a processor to identify all big plays in the statistics, wherein the big plays are defined as a team achievement performed by the offense, defense, or special teams unit;
   classify a subset of all possible plays in the at least one real-life American-style football contest or its adaptations as the big plays;
   assign a big play point value to each of the big plays, the big play point value relative to an impact the big play has on the at least one real-life American-style football contest or its adaptations, wherein at least one of the big play point values is different than the predefined traditional point value, and wherein at least one of the big plays is one of the all possible plays without the predefined traditional point value;
   categorize the big plays into categories, the categories comprising offensive big plays, defensive big plays, and special teams big plays,
      the offensive big plays being those big plays which are offensive with respect to the at least one real-life American-style football contest or its adaptations, wherein the offensive big plays are selected from the group consisting of:
         first-down to first-down, gain of 20+ yards, fourth down conversion, gain of 40+ yards, touchdown, two point conversion, touchdown of 50+ yards, forced turnover on downs "between the 20s", forced turnover on downs in red zone, fumble, fumble in/to red zone, fumble for touchdown, interception, interception in/to red zone, interception for touchdown, and safety;
      the defensive big plays being those big plays which are defensive with respect to the at least one real-life American-style football contest or its adaptations, wherein the defensive big plays are selected from the group consisting of:
         sack, intentional grounding, "three and out", fumble recovery, interception, opponent held to red zone field goal, two point conversion attempt defended, turnover forced on downs, fumble recovery returned to red zone, fumble recovery returned for touchdown, interception returned to red zone, interception returned for touchdown, opponent held to no score in red zone, safety, defensive touchdown, and turnover in "one score" situation to "ice" the at least one real-life American-style football contest or its adaptations; and
      the special teams big plays being those big plays which are special teams related with respect to the at least one real-life American-style football contest or its adaptations, wherein the special teams big plays are selected from the group consisting of:
         blocked/missed extra point attempt, coffin corner punt, coffin corner kick, fumble recovery, fumble recovery returned to red zone, fumble recovery returned for touchdown, ball returned beyond the 50 yard line by punt return team, ball returned beyond the 50 yard line by kickoff return team, ball returned to red zone by punt return team, ball returned to red zone by kickoff return team, ball returned for a touchdown by punt return team, ball returned for a touchdown by kickoff return team, blocked punt attempt, blocked field goal attempt, onside kickoff, fake punt for a first down, fake punt to the red zone, fake punt for a touchdown, fake field goal for a first down, fake field goal to the red zone, fake field goal for a touchdown, field goal less than or equal to 39 yards, field goal between 40 and 49 yards, and field goal greater than or equal to 50 yards, blocked punt, blocked punt in/to red zone, blocked punt for touchdown, blocked field goal attempt, blocked field goal attempt in/to red zone, blocked field goal attempt for touchdown, fumble "between the 20s", fumble in/to red zone, fumble for touchdown, failed onside kick returned beyond 50 yard line, failed onside kick returned to red zone, failed onside kick returned for touchdown, and blocked/missed extra point;
   transform each of the identified big plays to the big play point values;
   identify the big play point value for each of the big plays for each of the categories;
   tabulate all of the identified big play point values for each of the categories; and transform computer memory to represent a total of each category.

2. The apparatus of claim 1, wherein the apparatus is further operable to repeat the receiving, analyzing, classifying, assigning, categorizing, transforming, identifying, and tabulating for the one or more plays in the at least one real-life American-style football contest or its adaptations.

3. The apparatus of claim 1, wherein the big play point values are based on team element achievements.

4. The apparatus of claim 1, wherein all of the big play point values are accumulated to determine the true level of achievement and competition in the at least one real-life American-style football contest or its adaptations.

5. The apparatus of claim 1, the apparatus used in conjunction with a fantasy sports league, by selecting a "hybrid team" comprised of at least an offensive team element, a defensive team element, and a special teams team element from the two or more different competing real-life football teams engaged in the at least one real-life American-style football contest or its adaptations.

6. The apparatus of claim 5, wherein selecting the offensive team element, the defensive team element, and the special teams element is not limited by selections of said offensive team element, said defensive team element, and said special team element by participants of the fantasy sports league.

7. The apparatus of claim 1, the apparatus used in conjunction with a sports broadcast.

8. The apparatus of claim 1, the apparatus used in conjunction with sports gambling.

9. The apparatus of claim 1, wherein a big play frequency is determined for the big plays.

10. The apparatus of claim 1, wherein a big play efficiency is determined for the big plays.

11. The apparatus of claim 1, wherein a total team big play efficiency is determined for the big plays.

12. A non-transitory computer readable medium that is encoded with instructions for quantifying one or more relevant and active physical efforts performed by two or more different competing real-life football teams, the two or more different competing real-life football teams engaging in at least one real-life American-style football contest or its adaptations with a predefined traditional point value for certain plays and resulting in a traditionally defined winner and loser, the instructions executable on a processor to:
receive statistics via a communications medium in real-time, the statistics directly representing one or more plays from the at least one real-life American-style football contest or its adaptations relative to an offense, defense, or special teams unit, wherein the offense, defense, or special teams unit comprises eleven football players;
analyze the statistics in real-time on a processor to identify all big plays in the statistics, wherein the big plays are defined as a team achievement performed by the offense, defense, or special teams unit;
classify a subset of all possible plays in the at least one real-life American-style football contest or its adaptations as the big plays;
assign a big play point value to each of the big plays, the big play point value relative to the impact the big play has on the at least one real-life American-style football contest or its adaptations, wherein at least one of the big play point values is different than the predefined traditional point value, and wherein at least one of the big plays is one of the all possible plays without the predefined traditional point value;
categorize the big plays, the categories comprising offensive big plays, defensive big plays, and special teams big plays,
the offensive big plays being those big plays which are offensive with respect to the at least one real-life American-style football contest or its adaptations, wherein the offensive big plays are selected from the group consisting of:
first-down to first-down, gain of 20+ yards, fourth down conversion, gain of 40+ yards, touchdown, two point conversion, touchdown of 50+ yards, forced turnover on downs "between the 20s", forced turnover on downs in red zone, fumble, fumble in/to red zone, fumble for touchdown, interception, interception in/to red zone, interception for touchdown, and safety;
the defensive big plays being those big plays which are defensive with respect to the at least one real-life American-style football contest or its adaptations, wherein the defensive big plays are selected from the group consisting of:
sack, intentional grounding, "three and out", fumble recovery, interception, opponent held to red zone field goal, two point conversion attempt defended, turnover forced on downs, fumble recovery returned to red zone, fumble recovery returned for touchdown, interception returned to red zone, interception returned for touchdown, opponent held to no score in red zone, safety, defensive touchdown, and turnover in "one score" situation to "ice" the at least one real-life American-style football game or its adaptations; and
the special teams big plays being those big plays which are special teams related with respect to the at least one real-life American-style football contest or its adaptations, wherein the special teams big plays are selected from the group consisting of:
blocked/missed extra point attempt, coffin corner punt, coffin corner kick, fumble recovery, fumble recovery returned to red zone, fumble recovery returned for touchdown, ball returned beyond the 50 yard line by punt return team, ball returned beyond the 50 yard line by kickoff return team, ball returned to red zone by punt return team, ball returned to red zone by kickoff return team, ball returned for a touchdown by punt return team, ball returned for a touchdown by kickoff return team, blocked punt attempt, blocked field goal attempt, onside kickoff, fake punt for a first down, fake punt to the red zone, fake punt for a touchdown, fake field goal for a first down, fake field goal to the red zone, fake field goal for a touchdown, field goal less than or equal to 39 yards, field goal between 40 and 49 yards, and field goal greater than or equal to 50 yards, blocked punt, blocked punt in/to red zone, blocked punt for touchdown, blocked field goal attempt, blocked field goal attempt in/to red zone, blocked field goal attempt for touchdown, fumble "between the 20s", fumble in/to red zone, fumble for touchdown, failed onside kick returned beyond 50 yard line, failed onside kick returned to red zone, failed onside kick returned for touchdown, and blocked/missed extra point;
transform each of the identified big plays to the big play point values;
identify the big play point value for each of the big plays for each of the categories;
tabulate all of the identified big play point values for each of the categories; and
transform computer memory to represent a total of each category.

13. The non-transitory computer readable medium of claim 12, wherein the big play point values are based on team element achievements.

14. The non-transitory computer readable medium of claim 12, wherein all of the big play point values are accumulated to determine the true level of achievement and competition in the at least one real-life American-style football contest or its adaptations.

15. The non-transitory computer readable medium of claim 12, the medium used in conjunction with a fantasy sports league, by selecting a "hybrid team" comprised of at least an offensive team element, a defensive team element, and a special teams team element from the at least two different competing real-life football teams engaged in the at least one real-life American-style football contests or its adaptations.

16. The non-transitory computer readable medium of claim 15, wherein selecting the offensive team element, the defensive team element, and the special teams element is not limited by selections of said offensive team element, said defensive team element, and said special team element by participants of the fantasy sports league.

17. The non-transitory computer readable medium of claim 12, the medium used in conjunction with a sports broadcast.

18. The non-transitory computer readable medium of claim 12, the medium used in conjunction with sports gambling.

19. The non-transitory computer readable medium of claim 12, wherein a big play frequency is determined for the big plays.

20. The non-transitory computer readable medium of claim 12, wherein a big play efficiency is determined for the big plays.

21. The non-transitory computer readable medium of claim 12, wherein a total team big play efficiency is determined for the big plays.

22. A computer implemented method for quantifying one or more relevant and active physical efforts performed by two or more different competing real-life football teams, the two or more different competing real-life football teams engaging in at least one real-life American-style football contest or its adaptations with a predefined traditional point value for certain plays and resulting in a traditionally defined winner and loser, the method comprising:
receiving statistics via a communications medium in real-time, the statistics directly representing one or more plays from the at least one real-life American-style football contest or its adaptations relative to an offense, defense, or special teams unit, wherein the offense, defense, or special teams unit comprises eleven football players;
analyzing the statistics in real-time on a processor to identify all big plays in the statistics, wherein the big plays are defined as a team achievement performed by the offense, defense, or special teams unit;
classifying a subset of all possible plays in the at least one real-life American-style football contest or its adaptations as the big plays;
assigning a big play point value to each of the big plays, the big play point value relative to an impact the big play has on the at least one real-life American-style football contest or its adaptations, wherein at least one of the big play point values is different than the predefined traditional point value, and wherein at least one of the big plays is one of the all possible plays without the predefined traditional point value;
categorizing the big plays, the categories comprising offensive big plays, defensive big plays, and special teams big plays,
the offensive big plays being those big plays which are offensive with respect to the at least one real-life American-style football contest or its adaptations, wherein the offensive big plays are selected from the group consisting of:
first-down to first-down, gain of 20+ yards, fourth down conversion, gain of 40+ yards, touchdown, two point conversion, touchdown of 50+ yards, forced turnover on downs "between the 20s", forced turnover on downs in red zone, fumble, fumble in/to red zone, fumble for touchdown, interception, interception in/to red zone, interception for touchdown, and safety;
the defensive big plays being those big plays which are defensive with respect to the at least one real-life American-style football contest or its adaptations, wherein the defensive big plays are selected from the group consisting of:
sack, intentional grounding, "three and out", fumble recovery, interception, opponent held to red zone field goal, two point conversion attempt defended, turnover forced on downs, fumble recovery returned to red zone, fumble recovery returned for touchdown, interception returned to red zone, interception returned for touchdown, opponent held to no score in red zone, safety, defensive touchdown, and turnover in "one score" situation to "ice" the at least one real-life American-style football game or its adaptations; and
the special teams big plays being those big plays which are special teams related with respect to the at least one real-life American-style football contest or its adaptations, wherein the special teams big plays are selected from the group consisting of:
blocked/missed extra point attempt, coffin corner punt, coffin corner kick, fumble recovery, fumble recovery returned to red zone, fumble recovery returned for touchdown, ball returned beyond the 50 yard line by punt return team, ball returned beyond the 50 yard line by kickoff return team, ball returned to red zone by punt return team, ball returned to red zone by kickoff return team, ball returned for a touchdown by punt return team, ball returned for a touchdown by kickoff return team, blocked punt attempt, blocked field goal attempt, onside kickoff, fake punt for a first down, fake punt to the red zone, fake punt for a touchdown, fake field goal for a first down, fake field goal to the red zone, fake field goal for a touchdown, field goal less than or equal to 39 yards, field goal between 40 and 49 yards, and field goal greater than or equal to 50 yards, blocked punt, blocked punt in/to red zone, blocked punt for touchdown, blocked field goal attempt, blocked field goal attempt in/to red zone, blocked field goal attempt for touchdown, fumble "between the 20s", fumble in/to red zone, fumble for touchdown, failed onside kick returned beyond 50 yard line, failed onside kick returned to red zone, failed onside kick returned for touchdown, and blocked/missed extra point;
identifying the big play point value for each of the big plays for each of the categories;
tabulating all of the identified big play point values for each of the categories; and
transform computer memory to represent a total of each category.

23. The method of claim 22, wherein the big play point values are based on team element achievements.

24. The method of claim 22, wherein all of the big play point values are accumulated to determine the true level of achievement and competition in the at least one real-life American-style football contest or its adaptations.

25. The method of claim 22, the method used in conjunction with a fantasy sports league, by selecting a "hybrid team" comprised of at least an offensive team element, a defensive team element, and a special teams team element from the two or more different competing real-life football teams engaged in the at least one real-life American-style football contest or its adaptations.

26. The method of claim 25, wherein selecting the offensive team element, the defensive team element, and the special teams element is not limited by selections of said offensive team element, said defensive team element, and said special team element by participants of the fantasy sports league.

27. The method of claim 22, the method used in conjunction with a sports broadcast.

28. The method of claim 22, the method used in conjunction with sports gambling.

29. The method of claim 22, wherein a big play frequency is determined for the big plays.

30. The method of claim 22, wherein a big play efficiency is determined for the big plays.

31. The method of claim 22, wherein a total team big play efficiency is determined for the big plays.

\* \* \* \* \*